(12) United States Patent
Takahashi et al.

(10) Patent No.: US 9,638,606 B2
(45) Date of Patent: May 2, 2017

(54) TIRE SHAPE INSPECTION METHOD AND TIRE SHAPE INSPECTION DEVICE (71) Applicant: Kobe Steel, Ltd., Hyogo (JP)

(72) Inventors: Eiji Takahashi, Kobe (JP); Toshiyuki Tsuji, Kobe (JP); Masato Kannaka, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 317 days.

(21) Appl. No.: 14/411,977

(22) PCT Filed: Aug. 28, 2013

(86) PCT No.: PCT/JP2013/072991
§ 371 (c)(1),
(2) Date: Dec. 30, 2014

(87) PCT Pub. No.: WO2014/038444
PCT Pub. Date: Mar. 13, 2014

(65) Prior Publication Data
US 2015/0168267 A1 Jun. 18, 2015

(30) Foreign Application Priority Data
Sep. 4, 2012 (JP) .................. 2012-194205

(51) Int. Cl.
*G01B 11/24* (2006.01)
*G01M 17/02* (2006.01)
(Continued)

(52) U.S. Cl.
CPC ....... *G01M 17/027* (2013.01); *G01B 11/0608* (2013.01); *G01B 11/22* (2013.01);
(Continued)

(58) Field of Classification Search
CPC ..... G01B 11/0608; G01B 11/22; G01B 11/24; G01B 11/2408; G01B 11/25; G01B 21/045; G01M 17/027
(Continued)

(56) References Cited

U.S. PATENT DOCUMENTS
2004/0071334 A1 4/2004 Hassler et al.

FOREIGN PATENT DOCUMENTS
JP S62-232507 A 10/1987
JP H02-42306 A 2/1990
(Continued)

OTHER PUBLICATIONS

The extended European search report issued by the European Patent Office on Oct. 26, 2015, which corresponds to European Patent Application No. 13835087.1-1558 and is related to U.S. Appl. No. 14/411,977.
(Continued)

Primary Examiner — Tri T Ton
(74) Attorney, Agent, or Firm — Studebaker & Brackett PC (57) ABSTRACT A tire shape inspection method comprises a contact face acquisition step of acquiring contact face height changes by removing data outside of a prescribed range from detected tread face height data, a height change interpolation step of interpolating the section removed in the previous step using heights in the prescribed height range and acquiring height changes in the interpolated contact faces, and a runout value acquisition step of acquiring, as a runout value indicating the shape of the tread face, the difference between the maximum value and the minimum value in the height changes of the interpolated contact faces.

7 Claims, 6 Drawing Sheets (51) Int. Cl.
*G01B 11/06* (2006.01)
*G01B 11/22* (2006.01)
*G01B 11/25* (2006.01)
*G01B 21/04* (2006.01)

(52) U.S. Cl.
CPC .......... *G01B 11/24* (2013.01); *G01B 11/2408* (2013.01); *G01B 11/25* (2013.01); *G01B 21/045* (2013.01)

(58) Field of Classification Search
USPC ................................................. 356/600–613
See application file for complete search history.

(56) References Cited

FOREIGN PATENT DOCUMENTS

| | | |
|---|---|---|
| JP | 2006-192795 A | 7/2006 |
| JP | 2008-096152 A | 4/2008 |
| JP | 2008-286703 A | 11/2008 |
| JP | 2011141260 A | 7/2011 |
| WO | 2010/071657 A1 | 6/2010 |

OTHER PUBLICATIONS

International Search Report; PCT/JP2013/072991; Oct. 15, 2013.
Written Opinion of the International Searching Authority; PCT/JP2013/072991; Oct. 15, 2013.

TIRE SHAPE INSPECTION METHOD AND TIRE SHAPE INSPECTION DEVICE

TECHNICAL FIELD

The present invention relates to an inspection technology of a tire, and more particularly relates to a tire shape inspection method and a tire shape inspection device for inspecting the shape of a tread face being a contact face by using a method of image processing.

BACKGROUND ART

A tire has a complicated structure in which various materials, such as rubber, chemical fiber, and steel cord, are stacked. At a contact face (tread face) having such a complicated structure, uniformity of the tire radius has to be ensured and undulation (runout) of the contact face has to be restricted to prevent vertical vibration (radial runout) caused by a variation in tire radius.

Hence, occurrence of a runout is prevented in a manufacturing phase of a tire, and a runout of the contact face is inspected for a manufactured tire. In this inspection, a tire determined to have a large runout is removed from subjects to be shipped.

Owing to this, in a final step of tire manufacturing (inspection step after tire vulcanization), in particular, a runout at a tread face is measured and a shape defect at a sidewall face is inspected. A tread face of a tire has a tread pattern having protruding blocks forming contact faces and recessed grooves. Hence, when a runout at a tread face is measured, the heights of the protruding blocks at the contact faces have to be properly detected.

In recent years, for a technology of measuring a runout at such a tread face, there has been developed automation using an image inspection or the like with a laser distance sensor, a three-dimensional shape measurement device, or a camera.

For example, PTL 1 discloses a device for measuring the outer shape of a subject having bulges and dents at a surface. This device includes an optical displacement meter that provides scanning on a prescribed measurement portion of a subject, signal correction means for, in response to an output signal of the optical displacement meter, removing a prescribed signal pattern component from the output signal, and measurement means for measuring a prescribed shape based on a signal corrected by the signal correction means.

This shape measuring device evaluates a signal pattern component to be removed, by using a parameter based on an inclination of a signal pattern appearing in sampling data.

CITATION LIST

Patent Literature

PTL 1: Japanese Unexamined Patent Application Publication No. 62-232507

SUMMARY OF INVENTION

Technical Problem

PTL 1 describes that the tire shape detecting device can measure the outer shape of a tire without selecting a measuring line even if unnecessary bulges and dents are present on the surface of the tire, and can acquire correct measurement data at high speed.

To determine the signal pattern component to be removed with high accuracy in the sampling data by the tire shape detecting device, the parameter value based on the inclination of the signal pattern has to be properly set. However, since the parameter used in PTL 1 includes several kinds of parameters, it is a troublesome work to properly set the plurality of parameters for bulged and dented shapes which vary depending on the kind of tire. A good detection result may not be always obtained.

Also, when the tire shape detecting device in PTL 1 is applied to a tread face of a tire with many grooves like a winter tire, which has been widely spread in recent years, reproducibility of a measurement result obtained on a single measuring line is low and it is difficult to increase the reproducibility of the measurement result even if the plurality of parameter values are changed in various ways.

In light of the situation, an object of the invention is to provide a tire shape inspection method and a tire shape inspection device that can easily obtain measurement results with high reproducibility.

Solution to Problem

To attain the above-described object, the invention provides technical means as follows.

A tire shape inspection method according to the invention inspects a shape of a tread face formed of protruding blocks having contact faces formed at top portions of the protruding blocks and recessed grooves arranged between the protruding blocks by detecting height data of the tread face. The method includes a contact face acquisition step of acquiring height changes of the contact faces by removing height data outside of a prescribed height range from the detected height data of the tread face, the prescribed height range including an average value of the detected height data; a height change interpolation step of interpolating the section of the height data removed in the contact face acquisition step by using heights in the prescribed height range in the height changes of the contact faces acquired in the contact face acquisition step, and acquiring the interpolated height changes of the contact faces; and a runout value acquisition step of acquiring, as a runout value indicating the shape of the tread face, the difference between the maximum value and the minimum value in the interpolated height changes of the contact faces.

Preferably, the height data of the tread face may be detected on a detection line along a circumferential direction of the tire.

Preferably, the height data of the tread face may be detected on a plurality of the detection lines. Also, a plurality of the runout values may be acquired by repeating the contact face acquisition step, the height change interpolation step, and the runout value acquisition step every detected height data of the tread face, and the position of the detection line with the highest reproducibility of the acquired runout value may be determined as the position of the detection line for acquiring the runout value indicating the shape of the tread face of a tire which is a subject to be inspected.

Preferably, the method may further include a mask image generation step of capturing an image of line light on the tread face, the line light which is formed of sheet light irradiated on the tread face, acquiring an image of the tread face as an area image by applying triangulation to the captured line light, detecting boundary lines, which are the contours of the protruding blocks, in the acquired area image, and generating a mask image indicating the positions of the boundary lines. The height data of the tread face may be detected from the area image that is masked with the mask image generated in the mask image generation step. The runout value is acquired by applying the contact face acquisition step, the height change interpolation step, and the runout value acquisition step to the detected height data of the tread face.

In this case, when the runout value indicating the shape of the tread face is acquired in the runout value acquisition step, the interpolated height changes of the contact faces, which have been smoothed by using a low-pass filter, may be used.

Also, the prescribed height range used in the contact face acquisition step may be set by using a standard deviation of a distribution of the height data.

A tire shape inspection device according to the invention inspects a shape of a tread face formed of protruding blocks having contact faces formed at top portions of the protruding blocks and recessed grooves arranged between the protruding blocks by detecting height data of the tread face. The device includes a contact face acquisition portion that acquires height changes of the contact faces by removing height data outside of a prescribed height range from the detected height data of the tread face, the prescribed height range including an average value of the detected height data; a height change interpolation portion that interpolates the section of the height data removed by the contact face acquisition portion by using heights in the prescribed height range in the height changes of the contact faces acquired in the contact face acquisition step, and acquires the interpolated height changes of the contact faces; and a runout value acquisition portion that acquires, as a runout value indicating the shape of the tread face, the difference between the maximum value and the minimum value in the interpolated height changes of the contact faces.

Advantageous Effects of Invention

With the tire shape inspection method and the tire shape inspection device according to the invention, measurement results with high reproducibility can be easily obtained.

BRIEF DESCRIPTION OF DRAWINGS

Part (a) in FIG. 1 is a brief diagram showing a configuration of a tire shape inspection device according to an embodiment of the invention, and part (b) is a schematic illustration showing three-dimensional arrangement of a sport light irradiation portion and a light position detection portion in a sensor unit included in the tire shape inspection device.

DESCRIPTION OF EMBODIMENTS

An embodiment of the invention is described below with reference to the drawings.

Figure 1:
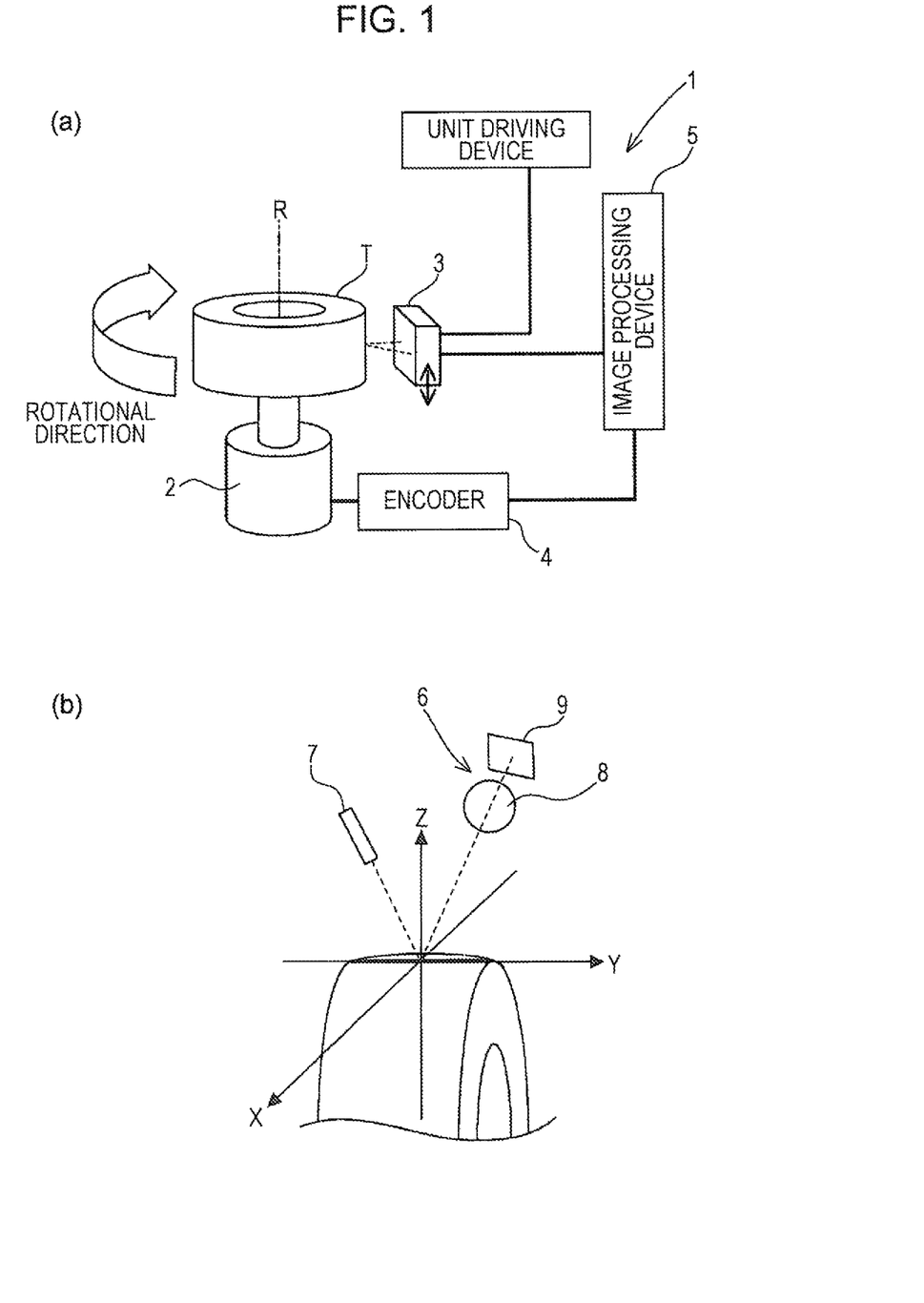

A tire shape inspection device 1 according to an embodiment of the invention detects a displacement in height (height displacement) of a tire surface by detecting reflection light of spot light irradiated on the surface (tire surface) of a rotating tire T by a light receiving element. The tire shape inspection device 1 detects the height of a tread face and the height of a sidewall face over the entire circumference among the tire surface, and acquires a detected displacement amount of the tire surface (height displacement amount) as a runout value indicating the shape of the tire surface. The shape of the tire surface is evaluated according to the runout value acquired as described above, and thus the shape of the tire T is inspected.

In case of the shape inspection for the tire T, the tread face where contact faces are formed, and the sidewall face where graphic symbols of a brand and the like are formed can be subjects to be inspected. In this embodiment, however, the tire shape inspection device 1 that inspects the tread face as a subject to be inspected is described.

A configuration of the tire T which is a subject to be inspected is described with reference to parts (a) and (b) in FIG. 2.

Figure 2:
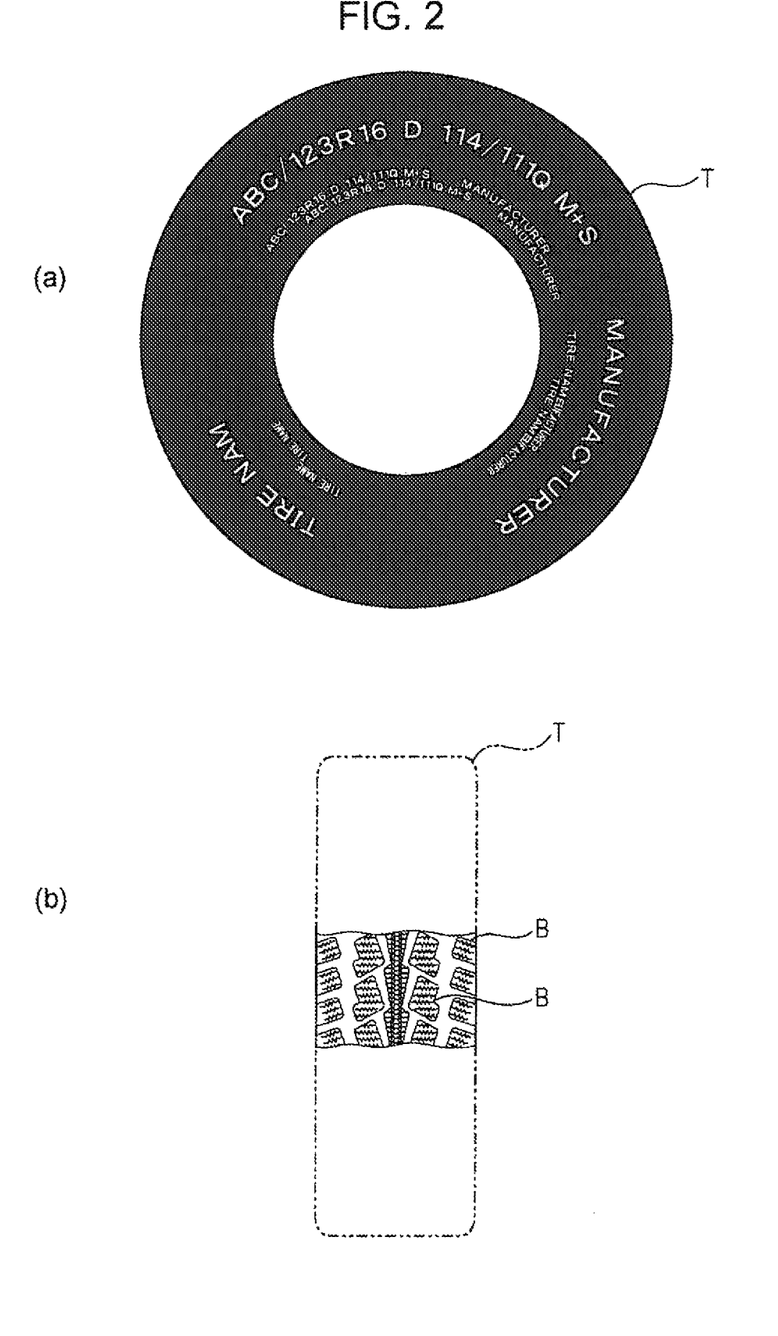
FIG. 2 is schematic illustrations showing the external shape of a tire, part (a) showing a sidewall face, part (b) showing a tread face.

FIG. 2 is a schematic illustration showing an external shape of the tire T. Part (a) in FIG. 2 shows a sidewall face of the tire T. Part (b) shows a tread face of the tire T. The tire T includes two sidewall faces arranged substantially perpendicularly to a road face, and a tread face connecting the two sidewall faces. As it is known, the tread face surrounding the outer circumference of the tire T is a surface curved to bulge toward the outer side in a radial direction of the tire. The tread face has a plurality of protruding blocks (protruding blocks) B forming contact faces at top portions of the protruding blocks B facing the outer side in the radial direction of the tire, and recessed grooves arranged between the plurality of protruding blocks B.

Figure 3:
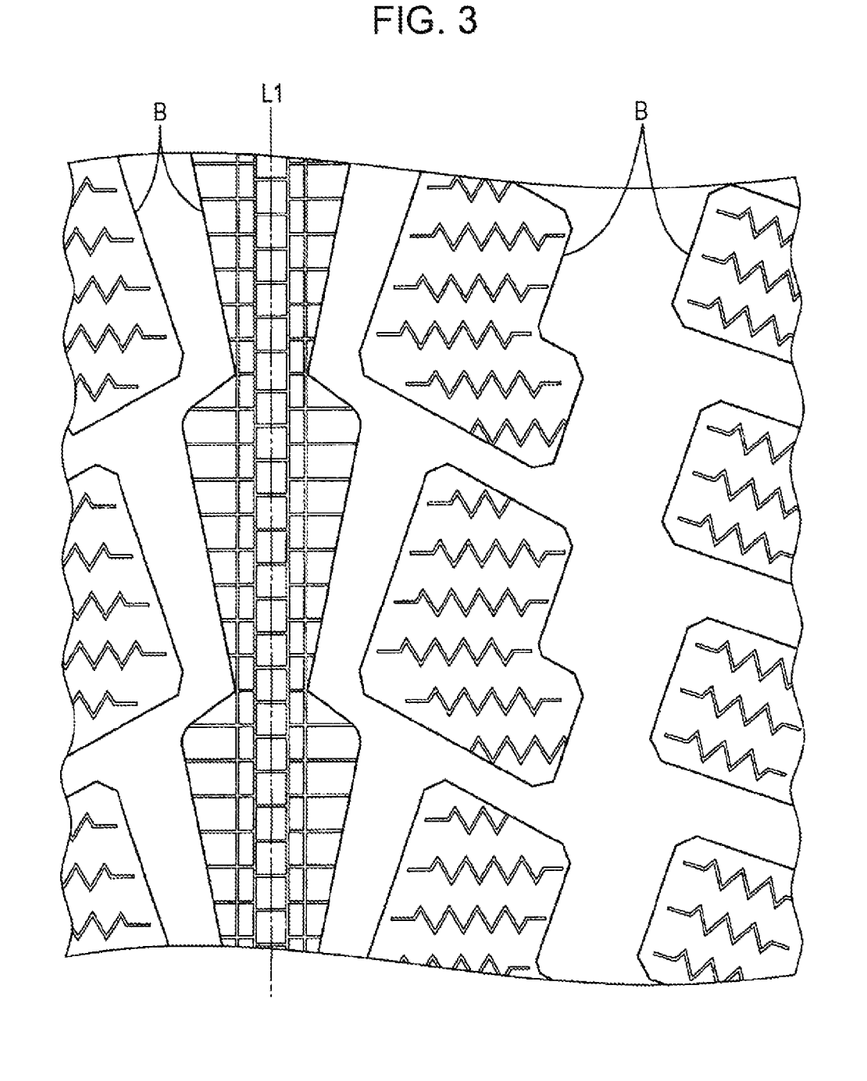
FIG. 3 is a schematic illustration showing a tread pattern of a tire.

FIG. 3 shows part of the curved tread face in plan. The tread face of the tire T has markedly different patterns for a summer tire and a winter tire. The tread face shown in FIG. 3 has more grooves than those of a summer tire, and hence is a winter tire.

As described above, the tread face of the tire T has the plurality of protruding blocks B having contact faces, and the plurality of recessed grooves formed between the plurality of protruding blocks B and in each block B. FIG. 3 is a front view of the tread face. In the tread face shown in FIG. 3, the contours of the contact faces of the plurality of protruding blocks B and the contours of the recessed grooves are illustrated.

The tire shape inspection device 1 according to this embodiment detects a change in height data (diameter change data of tire radius) indicating the height of such a tread face over the entire circumference in the circumferential direction.

Then, the tire shape inspection device 1 acquires a variation in height of each contact face of the plurality of protruding blocks B (hereinafter, referred to as height variation or height change), in other words, a variation in height of each contact face in the radial direction of the tire T (undulation along the circumferential direction), from the detected height data of the tread face. In the tire shape inspection device 1, a "runout value Ro" indicating the shape of the tread face of the tire T can be acquired from the difference between the maximum value and the minimum value of the height variation acquired as described above, and the surface shape of the tire T is evaluated.

The general configuration and its details of the tire shape inspection device 1 according to the embodiment of the invention are described below with reference to FIG. 1.

As shown in part (a) in FIG. 1, the tire shape inspection device 1 includes a tire rotator 2, a sensor unit 3, an encoder 4, an image processing device 5, etc.

The tire rotator 2 is a rotary machine that rotates the tire T, which is a shape inspection subject, around a rotation axis R of the tire T, and includes a motor or the like for rotating the tire T. The tire rotator 2 rotates the tire T at a rotation speed of, for example, 60 rpm. The sensor unit 3 (described later) detects the height of the tread face toward the outer side in the radial direction of the tire T, as the height data over the entire circumference in the circumferential direction of the tread face of the tire T during rotation of the tire T.

The sensor unit 3 is a unit having assembled therein a spot light irradiation portion 7 that irradiates the surface of the rotating tire T with spot light, a camera 6 that receives the spot light reflected from the tread face, etc.

Part (b) in FIG. 1 is an illustration schematically showing arrangement of equipment included in the sensor unit 3.

In part (b) in FIG. 1, the Y axis indicates the width direction of the tread face at a height detection position of the tread face, the Z axis indicates a detection height direction (direction of height to be detected of the tread face) from the tread face at the height detection position of the tread face, the Z axis is also a direction toward the outer circumference from the center of the tire T (outer side in the radial direction) along the radial direction of the tire T, and the X axis indicates a direction orthogonal to the Y axis and the Z axis. That is, in the sensor unit 3 used for the shape detection of the tread face of the tire T, the Y axis is a coordinate axis parallel to the rotation axis R of the tire T shown in part (a) in FIG. 1, and the Z axis is a coordinate axis indicating a direction normal to the rotation axis R of the tire T. The correspondence between the tire T and the respective coordinate axes may be changed depending on a way of supporting the camera 6.

The spot light irradiation portion 7 is equipment (device) that includes a spot light source formed of a semiconductor laser, a condenser lens, etc., and provides irradiation with a beam of laser light in a direction different from the detection height direction (Z-axis direction) at the height detection position so that small-diameter spot light is formed on the tread face of the tire T.

The laser light from the spot light irradiation portion 7 forms small-diameter spot light on the tread face of the tire T. The spot light is set at a single point (prescribed position) in the width direction of the tread face, and the tire T is rotated by the tire rotator 2. Hence, the tread face of the tire T is scanned with the spot light formed on the tread face over the entire circumference.

Also, the camera 6 includes a camera lens 8, and an image capturing device (light receiving element) 9 formed of, for example, a CCD (charge coupled device). The camera 6 receives reflection light (desirably, regular reflection light) of the spot light irradiated on the tread face of the tire T, by the surface of the light receiving element 9. A signal indicating the light receiving position and the brightness of the reflection light at the light receiving element 9 is output from the sensor unit 3 to the image processing device 5.

The tire rotator 2 is provided with the encoder 4. The encoder 4 is a sensor that detects the rotation angle of the rotation axis R of the tire rotator 2, that is, the rotation angle of the tire T, and outputs the detected rotation angle as a detection signal. The output detection signal is used for controlling the timing of reception of light (capture of image) of the spot light with the camera 6.

For example, the image processing device 5 receives a detection signal output from the encoder 4 every prescribed rotation angle of the tire T rotating at 60 rpm, and controls the sensor unit 3 so that the camera 6 captures an image of spot light in synchronization with a reception timing of the detection signal. Accordingly, an image of the spot light formed on the tread face can be captured at a prescribed image capturing rate corresponding to the reception timing of the detection signal.

By the image capturing operation for the spot light, the signal from the sensor unit 3 can provide image data acquired by scanning the entire circumference of the tread face (one line image along the circumferential direction at a prescribed position in the width direction of the tread face), and the one line image is input to the image processing device 5.

The image processing device 5 detects height data for one line scanned with laser light from the spot light source on the tread face, by applying a geometrical method such as triangulation to the input one line image.

Figure 4:
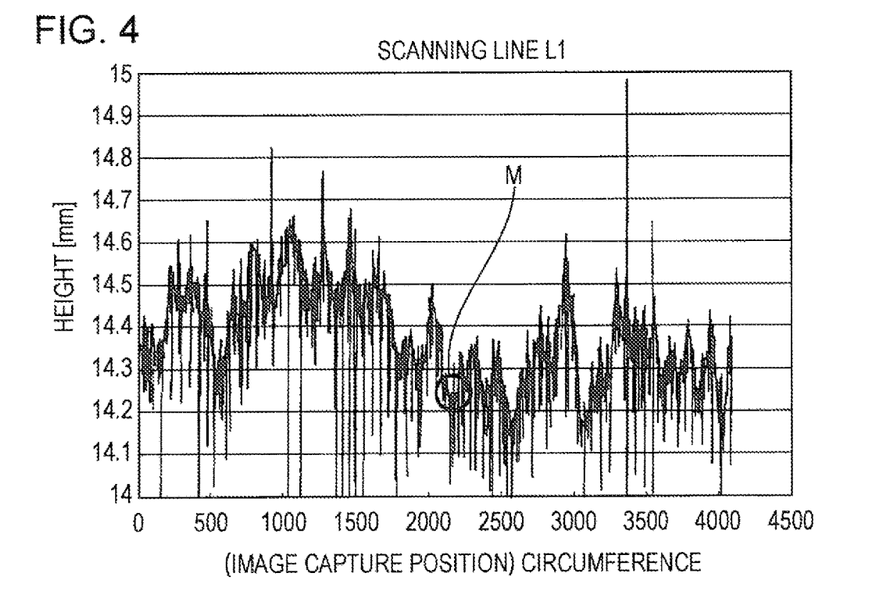
FIG. 4 is a graph showing height changes over the entire circumference of the tread pattern detected by the tire shape inspection device according to this embodiment.

FIG. 4 is a graph showing height data of the tread face detected one a scanning line (height variation detection line) L1 shown in FIG. 3.

In the graph in FIG. 4, the horizontal axis indicates the position at which a detection signal is output from the encoder 4 in one turn of the tread face, that is, the position of captured spot light. In one turn (360 degrees) of the tread face, for example, images of spot light are captured at image capture positions in a range from about 1000 points to 5000 points. Also, the vertical axis indicates the height [mm] of the tread face. That is, the graph shown in FIG. 4 connects height data at respective image capture positions with lines and shows the height data on the scanning line L1 of the tread face.

Figure 5:
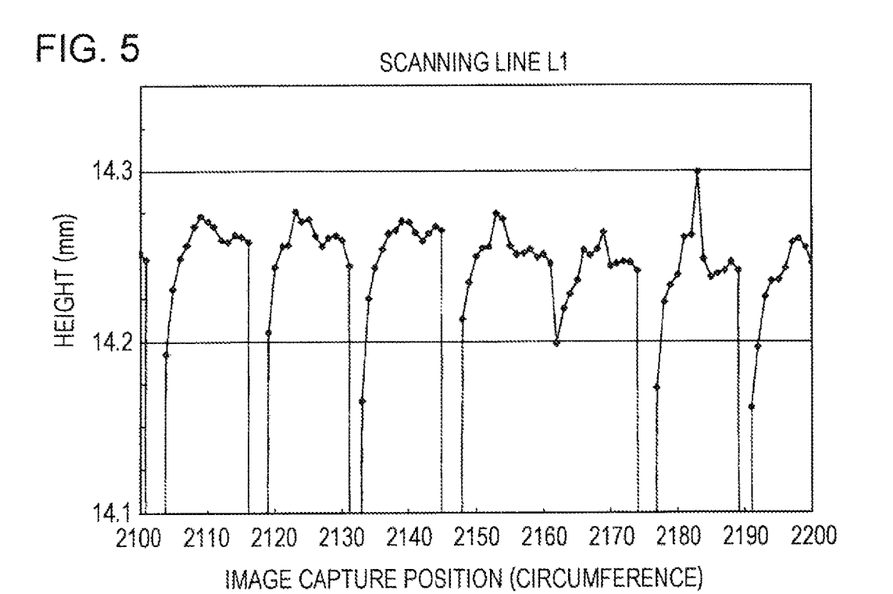
FIG. 5 is an enlarged view showing part of the graph indicating the height changes over the entire circumference of the tread pattern in an enlarged manner.
Figure 6:
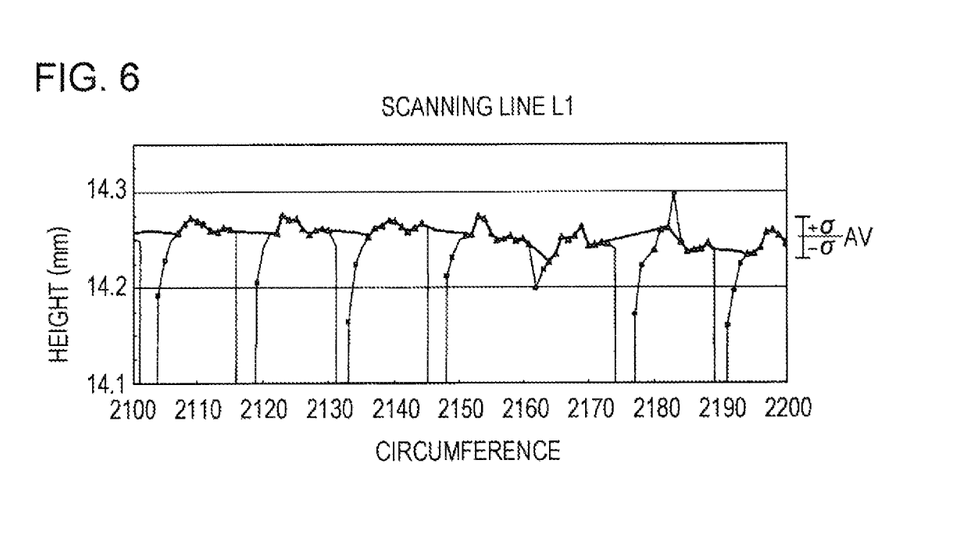
FIG. 6 is an illustration explaining a method of acquiring height changes of contact faces from the height changes of the tread pattern.
Figure 7:
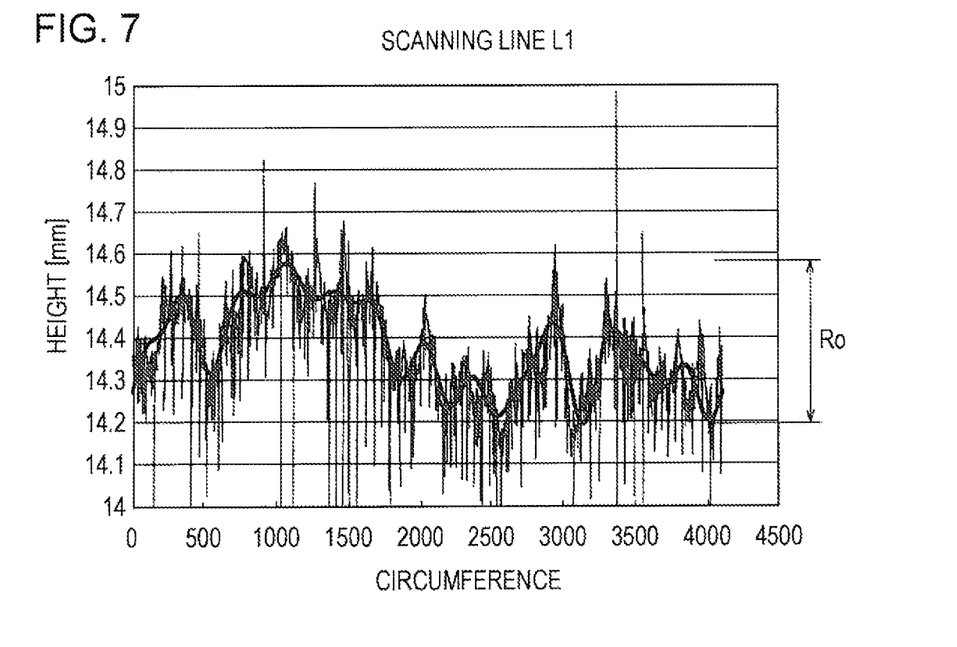
FIG. 7 is an illustration explaining a method of acquiring runout values from the acquired height changes of the contact faces.

With reference to FIGS. 5 to 7, processing of acquiring height changes of the contact faces from the height data of the tread face shown in FIG. 4, the processing which is a feature of the invention, is described. The processing described below is executed by the image processing device 5.

FIG. 5 is a graph showing part of the height data of the tread face shown in FIG. 4 and surrounded by a circle M among the height data of the tread face, in an enlarged manner. FIG. 5 indicates the height data of the tread face from an image capture position 2100 to an image capture position 2200 in an enlarged manner. In the graph shown in FIG. 5, the height at each image capture position is indicated as point data, and respective pieces of point data are connected with lines. Consequently, FIG. 5 illustrates a plurality of mountain-shaped figures.

The plurality of mountain shapes correspond to the protruding blocks B of the tread face, and areas between the mountain shapes correspond to the recessed grooves of the tread face. Hence, areas around the top portions of the plurality of mountain shapes indicate the heights of the contact faces formed at the top portions of the respective protruding blocks B. The left side of each mountain shape is slightly inclined as compared with the right side.

It may be conceived that the inclination is generated because reflection light from a side face of a protruding block B facing a groove is detected with the camera 6 instead of reflection light from a contact face of the protruding block B, and hence a height at a low position other than the contact face of the protruding block B is detected. In addition to the height of the side face of the protruding block B, a spew or a burr higher than the contact face may be occasionally detected. That is, the height data of the tread face shown in FIGS. 4 and 5 contain a height of a portion other than the contact face.

Owing to this, the image processing device 5 acquires the height changes of the contact faces by removing height data of a portion other than the contact faces from the height data of the tread face, or in other words, by extracting the height data of the contact faces (contact face acquisition step).

To be specific, a prescribed height range which is a range of height changes of the contact faces is set by using an average value AV of the height data of the tread face on the scanning line L1 shown in FIG. 4, and a dispersion σ2 or a standard deviation σ which is a characteristic of a distribution of the height data of the tread face. In this embodiment, a prescribed height range having a width that is a prescribed number of times a standard deviation σ of the height data around the average value AV of the detected height data of the tread face is set. In particular, the prescribed height range is a height range from about "average value AV±σ" to "average value AV±3σ" by using the average value AV and the standard deviation σ.

Among the height data of the tread face shown in FIG. 4, it is assumed that the height data included in this prescribed height range is the height data of the contact faces. Based on this assumption, by removing a height outside of the prescribed height range from the height data of the tread face, the height and groove of the side face of the protruding block B, the height of a spew or a burr being higher than the contact faces, and the like, are removed.

Consequently, the height data of the contact faces included in the prescribed height range is extracted (acquired) from the height data of the tread face shown in FIG. 5, like height data indicated in an enhanced manner with triangle marks in a graph in FIG. 6.

As shown in FIG. 6, after the extraction of the height data of the contact faces, the image processing device 5 acquires the height changes of the contact faces by interpolating heights removed because the heights are outside of the prescribed height range in the contact face acquisition step, by using heights in the prescribed height range and smoothing the heights, for the extracted height data of the contact faces (height change interpolation step).

To be specific, neighboring pieces of height data are connected with lines for the respective extracted pieces of height data. At this time, a line connecting neighboring height data indicates height data included in the prescribed height range defined by the average value AV and the standard deviation σ. At the same time, the line is for linearly interpolating the height data removed because the height data is outside of the prescribed height range in the contact face acquisition step.

Further, in the height change interpolation step, the image processing device 5 smoothens the height changes of the tread faces acquired by such linear interpolation by using, for example, a low-pass filter of, for example, about 4-th order to 16-th order. Hence, the image processing device 5 acquires a curve indicating height changes of the contact faces on the scanning line L1.

FIG. 7 shows a graph in which a curve indicating the height changes of the contact faces on the scanning line L1 acquired in the height change interpolation step is overlaid on the height data of the tread face shown in FIG. 4. As shown in FIG. 7, the curve indicating the height changes of the contact faces acquired through the contact face acquisition step and the height change interpolation step also indicates the height changes of the contact faces of the tire T.

Then, the image processing device 5 detects the maximum value and the minimum value in the curve of the acquired height changes of the contact faces, and acquires the difference between the detected maximum value and minimum value as a runout value Ro indicating the shape of the tread face (runout value acquisition step). By evaluating the magnitude of the acquired runout value Ro, the shape of the tread face of the tire T can be inspected.

Also, a local height change of the contact face on the scanning line L1 is evaluated, so that a bulge or a dent which may increase the rolling resistance of the tire T can be detected. To be specific, the height changes of the tread face before smoothing acquired in the height change interpolation step are smoothed by using a low-pass filter of, for example, about 20-th order to 100-th order, and the smoothed height changes of the contact faces are multiplied by a window function such as a rectangular window. In the smoothed height changes of the contact faces, by multiplying a waveform corresponding to 7 degrees of the rotation angle of the tire T by, for example, a window function such as a rectangular window, a Bulge/Dent value being a local runout value on the scanning line L1 is acquired, and a local height change of contact faces can be evaluated.

The window function used at this time is not limited to a rectangular window and may desirably select a window function corresponding to a measurement result desired to be obtained. Also, while the range cut by the window function is for 7 degrees in terms of rotation angle of the tire T, the range may be set for an angle corresponding to a measurement result desired to be obtained.

By executing the above-described steps, the runout value and Bulge/Dent value of the tread face on the scanning line L1 are acquired. However, if the height data of the tread face is acquired on the scanning line L1 a plural number of times, the same result as the height data of the tread face shown in FIG. 4 may not be always obtained. Ideally, in the tire shape inspection device 1, it is desirable to acquire a runout value and a Bulge/Dent value on a scanning line on which the same result can be always obtained.

Hence, height data of the tread face is acquired a plural number of times on each of a plurality of scanning lines in the width direction of the tread face, and the degrees of variations of a plurality of acquisition results are evaluated in terms of reproducibility of a measurement result. To be specific, reproducibility of a measurement result on each scanning line is evaluated by using the dispersion σ2 or the standard deviation σ used in the contact face acquisition step.

Figure 8:
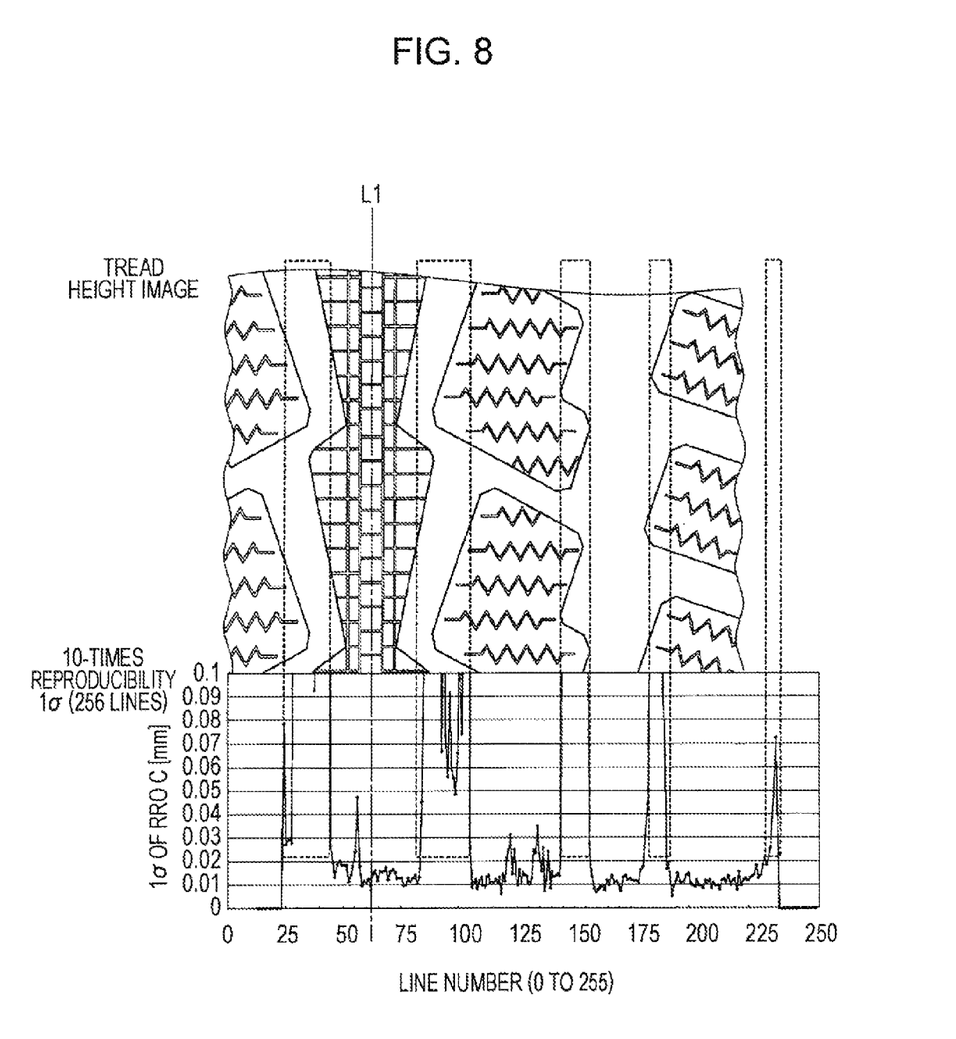
FIG. 8 is an illustration showing a graph evaluating reproducibility of runout values on a plurality of different detection lines.

FIG. 8 is a graph indicating reproducibility of a measurement result when about 200 scanning lines are set in the width direction of the tread face, and 10 height changes are acquired on each scanning line. The graph in FIG. 8 shows a variation width of the standard deviation σ in height data for 10 times on each scanning line. That is, a scanning line with a large variation width of the standard deviation σ has low reproducibility of the measurement result. Hence, such a scanning line is not appropriate for acquisition and evaluation of the runout value and Bulge/Dent value.

In the graph in FIG. 8, the scanning line L1 described in this embodiment has a small variation width of the standard deviation σ, and reproducibility of the measurement result is high. Hence the scanning line L1 can be a scanning line appropriate for acquisition and evaluation of the runout value and Bulge/Dent value. As described above, the reproducibility of the plurality of scanning lines may be preferably evaluated, and then a scanning line with the highest reproducibility may be used for the shape inspection of the tread face.

Further verifying the graph in FIG. 8, on a scanning line that passes an edge portion (edge) of a protruding block, the variation width of the standard deviation σ may be large and the reproducibility of the measurement result is low. In particular, if the edge of the protruding block is close and parallel to a scanning line, the reproducibility of the measurement result on the scanning line is extremely low.

Owing to this, boundary lines, which are the contours of the protruding blocks (that is, edge portions of the protruding blocks) are detected, and mask processing is executed on the boundary lines. That is, a mask image indicating the positions of the boundary lines of the protruding blocks is generated (mask image generation step). In this mask image generation step, while the sensor unit 3 includes a line light irradiation portion that irradiates the tread face with sheet light and an area camera that captures an image of line light formed on the tread face, triangulation is applied to the captured image of line light and an area image indicating a bulge and a dent of the tread face of the tire T is acquired. Accordingly, the boundary lines (i.e., edge portions of the protruding blocks), which are the contours of the protruding blocks can be detected.

To be specific, by masking the image of the tread face captured as an area image with the mask image generated in the mask image generation step, the section of the boundary lines of the protruding blocks is masked. The contact face acquisition step using the prescribed height range with the average value AV and the standard deviation σ is applied to the entire masked area image of the tread face, and the height changes of the contact faces are detected. Then, by applying the above-described height change interpolation step and runout value acquisition step to the detected height changes of the contact faces, not the runout value or the Bulge/Dent value on the single scanning line, but the runout value and the Bulge/Dent value of the entire tread face can be acquired.

The method of generating the mask image, the method of applying the mask image to the area image of the tread face, and the method of detecting the height changes from the masked area image may use, for example, methods disclosed in Japanese Unexamined Patent Application Publication No. 2011-141260 the applicant of which is the same as that of this application.

The embodiment currently disclosed is merely an example for all the described points, and does not intend to give limitations. In particular, regarding matters not explicitly disclosed in the currently disclosed embodiment, for example, an operation condition and a measurement condition, various parameters, dimensions, a weight, and a volume of a structure, the embodiment employs values within a range normally implemented by those skilled in the art and being able to be easily expected by those skilled in the art.

This application is based on Japanese Patent Application (Japanese Patent Application No. 2012-194205) filed Sep. 4, 2012, which is hereby incorporated by reference herein in its entirety.

REFERENCE SIGNS LIST 1 tire shape inspection device
2 tire rotator
3 sensor unit
4 encoder
5 image processing device
6 image capturing camera
7 spot light irradiation portion
8 camera lens
9 image capturing device

The invention claimed is:

1. A tire shape inspection method that inspects a shape of a tread face formed of protruding blocks having contact faces formed at top portions of the protruding blocks and recessed grooves arranged between the protruding blocks by detecting height data of the tread face, the method comprising:
   a contact face acquisition step of acquiring height changes of the contact faces by removing height data outside of a prescribed height range from the detected height data of the tread face, the prescribed height range including an average value of the detected height data;
   a height change interpolation step of interpolating the section of the height data removed in the contact face acquisition step by using heights in the prescribed height range in the height changes of the contact faces acquired in the contact face acquisition step, and acquiring the interpolated height changes of the contact faces; and
   a runout value acquisition step of acquiring, as a runout value indicating the shape of the tread face, the difference between the maximum value and the minimum value in the interpolated height changes of the contact faces.

2. The tire shape inspection method according to claim 1, wherein the height data of the tread face is detected on a detection line along a circumferential direction of the tire.

3. The tire shape inspection method according to claim 2, wherein the height data of the tread face is detected on a plurality of the detection lines, and
   wherein a plurality of the runout values are acquired by repeating the contact face acquisition step, the height change interpolation step, and the runout value acquisition step every detected height data of the tread face, and the position of the detection line with the highest reproducibility of the acquired runout value is determined as the position of the detection line for acquiring the runout value indicating the shape of the tread face of a tire which is a subject to be inspected.

4. The tire shape inspection method according to claim 1, further comprising:
   a mask image generation step of capturing an image of line light on the tread face, the line light which is formed of sheet light irradiated on the tread face, acquiring an image of the tread face as an area image by applying triangulation to the captured line light, detecting boundary lines, which are the contours of the protruding blocks, in the acquired area image, and generating a mask image indicating the positions of the boundary lines,
   wherein the height data of the tread face is detected from the area image that is masked with the mask image generated in the mask image generation step, and
   wherein the runout value is acquired by applying the contact face acquisition step, the height change interpolation step, and the runout value acquisition step to the detected height data of the tread face.

5. The tire shape inspection method according to claim 1, wherein, when the runout value indicating the shape of the tread face is acquired in the runout value acquisition step, the interpolated height changes of the contact faces, which have been smoothed by using a low pass filter, are used.

6. The tire shape inspection method according to claim 1, wherein the prescribed height range used in the contact face acquisition step is set by using a standard deviation of a distribution of the height data.

7. A tire shape inspection device that inspects a shape of a tread face formed of protruding blocks having contact faces formed at top portions of the protruding blocks and recessed grooves arranged between the protruding blocks by detecting height data of the tread face, the device comprising:

a contact face acquisition portion that acquires height changes of the contact faces by removing height data outside of a prescribed height range from the detected height data of the tread face, the prescribed height range including an average value of the detected height data;

a height change interpolation portion that interpolates the section of the height data removed in the contact face acquisition step by using heights in the prescribed height range in the height changes of the contact faces acquired by the contact face acquisition portion, and acquires the interpolated height changes of the contact faces; and a runout value acquisition portion that acquires, as a runout value indicating the shape of the tread face, the difference between the maximum value and the minimum value in the interpolated height changes of the contact faces.

\* \* \* \* \*